United States Patent Office 3,318,930
Patented May 9, 1967

3,318,930
REACTION PRODUCTS OF POLYMERIZED POLYENE HIGHER FATTY ACIDS AND POLY-1,2-ALKYLENAMIDES
Paul Fram, Lincoln Township, Washington County, and George H. Smith, Maplewood, Minn., assignors to Minnesota Mining and Manufacturing Company, St. Paul, Minn., a corporation of Delaware
No Drawing. Continuation of application Ser. No. 856,650, Dec. 2, 1959. This application May 13, 1963, Ser. No. 280,081
25 Claims. (Cl. 260—404.5)

This invention relates to polymeric compositions and more particularly to polymers of higher fatty acids copolymerized with certain polyfunctional amide-containing monomers.

This application is a continuation of our prior copending application Ser. No. 856,650, filed Dec. 2, 1959, now abandoned which is a continuation-in-part of our earlier filed application Ser. No. 683,682, filed Sept. 13, 1957, now abandoned.

It is an object of the present invention to provide thermosetting curable resin mixtures, including inter alia liquid, solvent-free compositions which cure smoothly and at relatively low temperatures (often at room temperature) and which when cured produce dense, tough, resinous or elastomeric solids which have good resistance to high temperature and high humidity and useful electrical insulation properties. Another object of the invention is to provide molding compositions which are resistant to moderately high temperatures. A further object of the invention is to provide compositions for encapsulating or embedding electrical circuits and other components. A still further object of the invention is to provide easily handled, solvent containing compositions which form useful protective coatings when applied to surfaces. Other objects of the invention will be apparent from the disclosure hereinafter made.

In accordance with the above and other objects of the invention it has been found that when certain low molecular weight polymers of higher fatty acids are copolymerided with the hereinafter defined polyfunctional alkyleneimine derivatives, resinous products are produced which have highly advantageous properties. They have excellent solvent resistance as well as resistance to water and high humidity and, in addition, have useful electrical insulating properties. They can be mixed and compounded in simple, open mixing equipment rather than closed containers and ball mills and when so mixed, they have useful pot lives at ambient temperature, so that they can be used conveniently in assembly line processing. They may be cast in inexpensive open molds, rather than high pressure and/or high temperature molds. They require no solvents and can be prepared as liquid mixtures containing 100 percent solids- forming components although they may also be diluted with solvents as desired. In liquid form they penetrate well, e.g., between the windings of coils and into other inaccessible areas in circuits as well into the detail of mold patterns to eliminate trapped air bubbles and provide complete impregnation or faithful pattern reproduction. They cure with substantially no volume change to yield solids which closely conform to the mold or container. In use for molding, encapsulation or potting, no stresses or strains are introduced into the pattern or component being molded or encapsulated or into the resin itself. This property is highly advantageous, for example, in the encapsulation of components which are sensitive to pressure, such as hysteresis loop elements for computers as well as for the preparation of molds which will faithfully reproduce patterns. The curing takes place at surprisingly low temperatures in view of the pot life, often at room temperature. The compositions cure with a relatively low exotherm and hence large encapsulations may be made when desired without fear of undue build-up of heat during curing. They are particularly useful in the encapsulation of parts which are so fragile or are of such materials that they are destroyed by heat, and in applications in which it is difficult or undesirable to heat the resin and parts to be coated until sufficiently intimate contact between resin and parts is obtained, such as elements and subassemblies for electronic instruments, for example, computers and the like. They are unreactive toward and adhere well to copper, glass, reinforced epoxy laminates and other materials commonly used in fabricated electrical circuits.

The compositions of the present invention are extremely stable to heat when cured, retaining desirable mechanical and chemical properties at high temperatures, and are useful as flexible molding materials which are so resistant to heat that they may be used to prepare molds for the repeated casting of relatively low melting metals.

The compositions of the invention offer unique advantages, e.g., in the fields of flexible molding materials and encapsulation, when compared to the various other known polymer systems which form low temperature curing, solvent-free liquid compositions. Thus, for example, the polysulfide rubbers are relatively unstable with respect to their mechanical properties, particularly at elevated temperatures. Furthermore the polysulfide rubbers tend to attack and corrode metals. This is particularly disadvantageous where an electric circuit which is to be encapsulated contains very fine metal wires. Systems cured with isocyanates (e.g. hydroxyl-terminated polyesters cured with diisocyanates) are sensitive to moisture during preparation and in addition, some of the isocyanate chemicals, especially those of relatively low molecular weights, may have very irritating physiological effects. During curing, the formation of gas and consequent sponging of the composition particularly along the surfaces of the encapsulated component is common, and is obviously disadvantageous. The resulting rubbers soften severely at elevated temperatures and have very poor adhesion to the metal when cured. Ordinary epoxy resin systems generally require at least a short cure at elevated temperatures (of the order of 100° C.) to obtain optimum results, or have high exotherm and short pot life after addition of the curing agent, and the resulting resins have poor impact strength and are generally rather stiff and frangible unless modified. The copolymers of the present invention have been found to have none of these disadvantages.

Low polymers of the higher fatty carboxylic acids which are suitable for use in the present invention can be characterized as polymeric fatty acids of the drying and semi-drying oils. They are derived from unsaturated monomers having at least two double bonds and containing carboxyl groups; and can therefore be designated as polymerized polyene higher fatty acids. Illustrative monomeric fatty acids of the type used for the purpose are octadecadienoic acids containing two double bonds, like linoleic acid, and octadecatrienoic acids containing three double bonds such as linolenic and eleostearic acids. The preparation of such polymeric polyene higher fatty acids is described, for example, in U.S. Patents 2,482,761, 2,373,015 and 2,435,478 and in an article in the Paint, Oil and Chemical Review of January 4, 1951 (starting at page 13). They can be prepared by heating the monomeric unsaturated acids in the presence of water (steam), which is held in the reaction zone by carrying out the reaction in a pressure vessel. While the actual structure of the polymeric products is not known with particularity, it appears that the polymerization of the unsaturated fatty acids takes place by intermolecular condensation at the double bonds. The reaction products obtained generally comprise dimers and trimers formed by condensation of two or three molecules of the higher fatty acids, respectively. Further polymerization can also give rise to tetramers or higher polymers. Commonly it is observed that a preponderance of the dimeric polymer is formed, in admixture with the trimeric polymer. While the dimeric products can be employed in substantially pure form in the compositions of the invention, the cured end-products formed from compositions containing the trimeric products or the mixture of dimeric and trimeric higher fatty acids are especially useful in that they produce more durable cured resins. Therefore, it is preferred to use trimeric or mixtures of dimeric and trimeric or higher polymers of the polyene higher fatty acids in the compositions of the invention.

The polymerized polyene higher fatty acids which result from the preparatory processes described in the patents and article referred to hereinabove can be characterized by their average molecular weights. Thus, the dimeric, dibasic higher fatty acid polymers prepared from C-18 acids have been described as having an average molecular weight of about 560 while the corresponding trimeric, tribasic acids have an average molecular weight of about 840. Obviously, mixtures of the dimeric and trimeric acids will have molecular weights which are intermediate these numbers, while the tetramers and mixtures containing them will have correspondingly higher molecular weights. The reactivity of the polymerized polyene fatty acids toward the polyfunctional alkylenimine derivatives may be characterized by their acid numbers (the number of milligrams of potassium hydroxide required to neutralize 1 gram of sample). The preferred acid number range for these materials in the present invention is from about 50 to about 250. Polymerized polyene fatty acids having acid numbers below this range react with unnecessary slowness and are difficult to cure completely at lower temperatures while those having acid numbers substantially above 250 react so rapidly as to be difficult to handle under certain conditions, particularly in large encapsulations (e.g. excessive exotherms, premature gelling, etc.). The commercially available polymerized polyene fatty acids, generally have acid numbers from about 170 to about 210 and this forms a particularly preferred range in the present invention.

Illustrative of the polymerized higher fatty acids which may be employed herein are, for example, a dibasic dimerized linoleic acid product of approximately 600 molecular weight which typically has a dimer:trimer acid ratio of about 95:5 percent, an acid number of 188–193, a saponification value of 194–198, a neutralization equivalent of 292–298 and a viscosity at 25° C. of approximately 5,600 centistokes (available, under the trade designation "Emery 3079–S" polymerized fatty acid); a tribasic trimerized linoleic acid product of an average molecular weight of approximately 845 which varies in trimer acid content from about 70 to 85 percent (the remainder being composed essentially of dimer acid) and which typically has an acid number of 183–188, a saponification value of 192–198, a neutralization equivalent of 299–306 and a pour point of about 13° C. (available under the trade designation "Emery 3055–S" polymerized fatty acid); a tribasic trimerized higher fatty acid product of approximately 900 molecular weight which typically has a trimer acid content of 90–95 percent (the balance being composed essentially of dibasic acid), an acid number of 183–188, a saponification value of 192–198, a neutralization equivalent of 299–306 and a pour point of about 13° C. (available under the trade designation "Emery 3162–S" polymerized fatty acid); a liquid tribasic trimerized higher fatty acid product which has a relatively low iodine value, a neutralization equivalent of about 311 and a calculated acid number of 180 (available under the trade designation "Emery 3130–R" polymerized fatty acid); a highly viscous liquid black low polymeric product of a higher fatty acid which has a neutralization equivalent of 267 and a calculated acid number of 210 (available under the trade designation "Emery 3215–R" polymerized fatty acid); a viscous, liquid, purified, dimerized higher fatty acid product which has a relatively low iodine value, a neutralization equivalent of about 309 and a calculated acid number of 182 (available under the trade designation "Emery 3244–R" polymerized fatty acid); a highly viscous light yellow colored liquid tetrameric higher fatty acid product which has an acid number of about 170 and an average molecular weight of about 700 (obtainable under the trade designation "4308–F" polymerized fatty acid); etc.

While the structures of these polymerized acids are not definitely known it has been postulated that the structures of the dimer and trimer of linoleic acid are as follows:

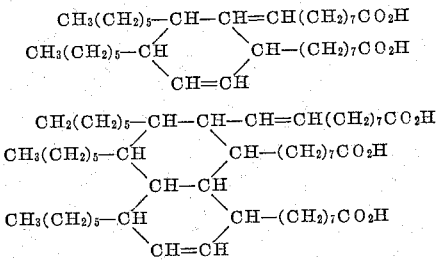

Regardless of the accuracy of these proposed structures and of the mechanism of polymerization of linoleic acid and other fatty acids, useful products are formed by the reaction of these polymerized polyene higher fatty acids with the polyfunctional amide-containing monomers as herein described.

Other higher fatty acids from which low polymers suitable for use in the present invention may be prepared include those acids present in the mixtures of fatty acids derived from soybean oil, peanut oil, linseed oil, dehydrated castor oil, corn oil, tung oil, cottonseed oil, sardine oil, tall oil and other oils of the drying or semi-drying type. The primary constituents of these and other oils of this type are $C_{16}$ to $C_{18}$ unsaturated fatty acids together with lesser amounts of saturated acids of the same chain lengths. The total range of chain lengths of the fatty acid constituents of such oils is from about $C_{14}$ to $C_{22}$.

These polymerized polyene higher fatty acids are additionally characterized by being substantially liquid, that is liquid or semi-solid at ordinary temperatures, or easily liquefied by moderate warming. Furthermore, it is of course possible to use together mixtures of polymerized polyene higher fatty acids as well as individual polymers in admixture with small amounts of unpolymerized saturated or unsaturated higher fatty acids in carrying out the process of the present invention. In fact, less pure commercially available polymerized polyene higher fatty acid products commonly are found to contain an amount of unpolymerized material and these are quite suitable for use in the compositions herein described.

If desired, the polymerized polyene higher fatty acids can be subjected to hydrogenation to remove residual unsaturation in whole or part. Resinous compositions prepared by employing with these the polyfunctional alkylenimine derivatives of the invention exhibit enhanced electrical and mechanical properties, especially at higher operating temperatures.

As noted, the compositions formed using polymerized polyene higher fatty acids and the polyfunctional alkylenimine derivatives as co-monomers are ordinarily initially liquid, or semi-solid, substantially 100 percent solids-forming mixtures. Such compositions are highly advantageous because they exhibit little or no shrinkage upon final curing. Furthermore, the liquid nature of these co-monomer mixtures is important in compounding and molding, i.e., simple mixing equipment may in most instances be used in place of ball mills and simple open molds may be used in place of high pressure and/or high temperature molds. Similarly, the liquid form of the polymerized polyene higher fatty acids allows the polyfunctional alkylenimine derivatives to be more easily dispersed into them, although it is also possible when desired to put the polyfunctional alkylenimine derivatives (which may be solids or liquids) into solution with compatible volatile solvents such as chloroform and to mix this solution with the polymerized polyene higher fatty acid. The solvent can then be removed, as by evaporation. Additionally, no gasses are given off by the solvent-free systems during curing, whereby bubble-free resins are readily obtained. Because of the relatively low temperature required for curing, encapsulation or mold preparation may be accomplished where it is difficult or impossible to heat the wire or circuit to be encapsulated or the mold pattern, e.g., at ambient temperature and at the location of the circuit component to be encapsulated. When cured, the compositions of the invention retain useful mechanical properties at relatively high temperatures.

The preferred class of polyfunctional alkylenimine derivatives which are employed in preparing the polymers of the invention are poly-1,2-alkylenamides represented by the following illustrative formula:

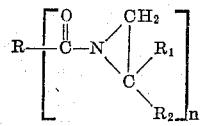

wherein R represents a member of the group consisting of divalent aliphatic, e.g., alkylene, radicals having from about 4 to 53 carbon atoms, the 1,3-phenylene radical, the 1,4-phenylene radical and the 1,3,5-phenyline radical, $R_1$ and $R_2$ each represented hydrogen or an alkyl radical having from 1 to 8 carbon atoms, and $n$ is a number corresponding to the valency of R. It is noted that the term 1,3,5-phenyline refers to the trivalent aromatic ring group $C_6H_3\equiv$ which may alternately be designated 1,3,5-phenenyl. The aliphatic radicals are divalent and may contain straight or branched chains and atoms other than carbon atoms, e.g., oxygen and sulfur atoms and the like.

The poly-1,2-alkylenamides included within the scope of the above formula are characterized by properties which permit storage without spontaneous polymerization. They are controllably reactive to form useful homopolymers, and are especially useful for the purpose of curing carboxyl group-containing prepolymers as disclosed herein.

Among the poly-1,2-alkylenamides useful in accordance with the invention are

N,N'-bis-1,2-ethylenadipamide;
N,N'-bis-1,2-propylenadipamide;
N,N'-bis-1,2-butylenadipamide;
N,N'-bis-1,2-ethylenisosebacamide;
N,N'-bis-1,2-propylenisosebacamide;
N,N'-bis-1,2-butylenisosebacamide;
N,N'-bis-1,2-ethylensebacamide;
N,N'-bis-1,2-pentylensebacamide;
N,N'-bis-1,2-ethylendodecanoyldicarboxylic acid amide;
N,N' - bis - 1,2 - propylentetradecanoyldicarboxylic acid amide;
N,N'-bis-1,2-ethylenhexadecanoyldicarboxylic acid amide;
N,N'-bis-1,2-ethylenoctadeconoyldicarboxylic acid amide;
N,N'-bis-ethylenthiodipropionamide;
N,N'-bis-ethylenoxydipropionamide;

and the poly-1,2-alkylenamide product of the interreaction of ethyleneimine with Emery 3020-S polymerized fatty acid chloride (prepared by reaction of $PCl_3$ with Emery 3020-S polymerized fatty acid, a product of the polymerization of $C_{18}$ unsaturated fatty acid which has an iodine value of 35–45, a neutralization equivalent of 295–310, a refractive index at 25° C. of 1.4858, and a monomer:dimer:trimer weight ratio of 3:72:25). Other poly-1,2-alkylenamides useful in accordance with the invention are N,N'-bis-1,2-ethylenisophthalamide;
N,N'-bis-1,2-butylenisophthalamide;
N,N'-bis-1,2-propylenisophthalamide;
N,N'-bis-1,2-octylenisophthalamide;
N,N'-bis-2,2-dimethylethylenisophthalamide;
N,N'-bis-1,2-propylenterephthalamide;
N,N'-bis-1,2-butylenterephthalamide;
N,N',N''-tris-1,2-ethylenetrimesamide;
N,N',N''-tris-1,2-propylentrimesamide;
N,N',N''-tris-2-isopropylethylenetrimesamide;
and N,N',N''-tris-2,2-dipropylethylenetrimesamide, etc.

Mixture of these monomers may be produced by employing mixed 1,2-alkylenimines in producing them.

The poly-1,2-alkylenamide comonomers are prepared in monomeric form by the following process: a 1,2-alkylenimine having the following structure:

wherein $R_1$ and $R_2$ are as previously defined (such as ethylenimine, 1,1-dimethyl-ethylenimine, 1,2-propylenimine, 1,2-butylenimine, 1,2-pentylenimine, etc.) is reacted with a suitable polycarboxylic acid chloride to produce the desired substantially pure monomer, with hydrogen chloride as a by-product. The 1,2-alkylenimine is employed in a ratio of about 1 mole for each mole of acid chloride group in the polycarboxylic acid chloride, i.e. in the case of a dicarboxylic acid chloride the molar ratio of the reactants would be two mols of the 1,2-alkylenimine to one mole of the dicarboxylic acid chloride coreactant. Advantageously, an excess of 1,2-alkylenimine, such as about 5 percent by weight, over and above this ratio may be employed, although an excess of up to about 25 percent may be employed.

Desirably, the 1,2-alkylenimine is introduced in an aqueous solution which also contains an ammonium or alkali metal carbonate, such as sodium, potassium, or lithium carbonate, which acts as an acid-acceptor to neutralize the hydrogen chloride formed during the reaction of the process. When a higher 1,2-alkylenimine than 1,2-ethylenimine, i.e., one containing more than 2 carbon atoms, is employed, an ammonium or alkali-metal bicarbonate, such as sodium, potassium, or lithium bicarbonate may be used as the acid-acceptor instead of a carbonate. This aqueous solution is intimately mixed with the polycarboxylic acid chloride dissolved in a substantially water-immiscible organic solvent which is chemically inert to both the reactants and the reaction products and in which the resulting poly-1,2-alkylenamide is soluble. The poly-1,2-alkylenamide monomer reaction product is then recovered in a relatively pure, stable state in high yield from the organic solvent, in which it collects as the reaction proceeds, by evaporating the solvent. By this process of producing the monomers any possibility of attack on and decomposition of the poly-1,2-alkylenamide by hydrogen chloride formed during the course of the reaction is effectively minimized.

The preparation and properties of the poly-1,2-alkylenamides useful in the preparation of the copolymers of the invention are disclosed in the application of George H. Smith, S.N. 832,152, filed August 7, 1959 now U.S. Patent 3,115,474 and S.N. 840,255, filed September 16, 1959, now U.S. Patent 3,115,482 wherein the preparation and properties of a number of these substances are disclosed in detail. In S.N. 840,255, for example, the preparation of the N,N'-bis-1,2-alkylenisosebacamides from the corresponding alkylenamides and the diacid chloride of isosebacic acid (a product consisting of 72–80 percent of 2-ethylsuberic acid, 12–18 percent of 2,4-diethyladipic acid and 6–10 percent of n-sebacic acid) is described.

The poly-1,2-alkylenamide monomers are preferably utilized in substantially pure form, i.e., having at least 85 percent of the amide groups thereof in the form of azirane rings. This may be expressed also as a composition containing at least 85 percent of the nitrogen (excluding nitrogen not originally derived from the alkylenimine) in the form of azirane rings. Lots which contain less than 85 percent of the theoretical amount of the azirane ring according to the structure of the particular polyalkylenamide correspondingly contain more than about one weight percent halide (calculated as the halogen). Such impure products are unstable to aging and cannot be heated without degradation, while their reactions with other reactants may not be controllable.

The polymer-producing composition provided by admixture of the polymerized higher fatty acids and the poly-1,2-alkylenamides included within the scope of the invention are generally speaking, when first prepared, substantially liquid or viscous, semi-solid substances which can be compounded with fillers and the like to produce more or less viscous products. (By the term "substantially liquid" as used throughout the specification it is meant that the substance is capable of flowing. Materials of very high viscosity may required warming to facilitate handling.) The uncured systems may be poured or otherwise introduced into molds surrounding circuits, wires, etc. which are to be encapsulated. The compositions undergo spontaneous curing producing cured polymer systems which provide firmly-adhered, solid chemically-inert, moisture and solvent resistant encapsulations having useful electrical properties. Mold release agents are commonly utilized to prevent adhesion when the compositions are used as molds.

For many applications, compositions consisting solely of polymerized polyene higher fatty acid and poly-1,2-alkylenamide will be preferred, e.g., in electrical encapsulations, since the resulting electrical properties are often best when no adjuvants are included. In other cases it may be found desirable to load or extend the resinous composition, e.g. by the addition of particulate or fibrous fillers such as fuller's earth, quartz flour, asbestos, glass filaments, etc. or to otherwise modify the electrical, physical or chemical properties of the resin by incorporation of plasticizers, colorants, resins, conductive material such as carbon or metal powders, etc. which may be considered as adjuvants and the like. The finer fillers are good reinforcing agents for these systems, neutral fillers such as calcium carbonate, iron oxide and titanium dioxide being preferred. Acidic fillers such as certain carbon blacks and silicas can also be used if proper adjustments are made for pH (e.g. addition of increased amounts of poly-1,2-alkylenamide).

Among the other adjuvants which may be used with the compositions of the invention are solvents, e.g. hydrocarbons such as heptane, benzene, toluene and xylylene, chlorinated solvents such as carbon tetrachloride, chloroform and trichloroethylene, ketones such as acetone and methyl ethyl ketone, and alcohols such as isopropanol; and antioxidants, e.g. symmetrical di-beta-naphthyl paraphenylene diamine (available under the trade designation "Agerite White"), certain liquid phenol-formaldehyde A-stage resins (e.g. "Stabilite White" liquid antioxidant), diorthotolyl ethylene diamine (available under the trade designation "Stabilite Alba"), etc.

Broadly, the curable compositions of the invention are prepared by simple admixture of the components thereof. While an amount of the poly-1,2-alkylenamide, the imine ring content of which is equivalent stoichiometrically to the number of carboxyl groups present in the selected polymerized polyene higher fatty acid component, may be employed, and some curing effect can be obtained with even smaller amounts, more complete cures are effected when amounts greater than stoichiometric amounts are employed, ranging upwards from 10 to 100 percent greater; and it is ordinarily preferred that about 20 to 40 percent excesses of the theoretical stoichiometric equivalent of the poly-1,2-alkylenamide be used in order to compensate for any inerts in the poly-1,2-alkylenamide, its adsorption on and reactivity with fillers, etc. The initiation of and the rate of cure are dependent to a degree upon the temperature, the viscosity of the mixture and the amount of the particular poly-1,2-alkylenamide which is employed. By maintaining the mixture at low temperatures, for example, about 0–10° C., the polymerization is retarded and increased pot life is obtained.

In order more clearly to disclose the nature of the present invention, several examples illustrating products and compositions thereof will now be described. It should be understood, however, that this is done solely by way of example of the best mode presently contemplated for carrying out the invention, and is intended neither to delineate the scope of the invention nor to limit the ambit of the appended claims. All parts are by weight unless otherwise designated. At least 85 percent of the amide groups of the poly-1,2-alkylenamides used in the examples are in the form of azirane rings.

*Example 1*

About 100 parts of "Emery 3055–S" polymerized fatty acid (having a dimer-trimer ratio of about 15:85) and 53 parts of liquid N,N'-bis-1,2-ethylenisosebacamide are mixed thoroughly. A portion of the resulting viscous syrup is placed in a mold and heated in an air oven at 85° C. for about 2 hours, whereupon a rubber-like solid having a hardness, Shore A–2 (ASTM D676–49T), of 44 is formed. After a post-cure of 14 hours at 120° C., the hardness (Shore A–2) is 49. The amount of water absorption, as determined by immersing ⅛" thick discs of the resin in 25° C. water for 24 hours, is 1.07 percent.

The resistance to deformation under load at elevated temperatures of this bis-amide-higher fatty acid copolymer is very great, thus emphasizing its excellent high-temperature properties. This property is measured as the temperature at which a weighted bar will deform cured resin specimens which have rectangular cross-sections of 0.5 inch by 0.625 inch and which are 5 inches in length. The specimen to be tested is placed in a temperature controlled test chamber on parallel metal supports which are 4 inches apart and oriented so that the 0.5 inch dimension is vertical. A bar bearing a 3 pound load is placed against the specimen midway between the supports and parallel to them, the bar and the supports all being rectangular in cross-section but rounded along their respective contacting edges to a ⅛" radius cross-section. The temperature in the test chamber is then raised at a rate of about 5° C./minute while the specimen is observed. In the present case no appreciable additional distortion of the bis-amide copolymer sample is noted as the temperature of the test chamber is raised from approximately 25° C. up to 150° C., at which point the test is terminated.

The viscous syrupy mixture of 100 parts of "Emery 3055–S" polymerized fatty acid and 53 parts of N,N'-bis-1,2-ethylenisosebacamide can be reduced in viscosity as desired by adding solvents to it. Such a mixture formed by adding 25 parts of xylylene to the above constituents is applied to wooden test panels, the solvent is allowed to evaporate at room temperature and the panels are placed in an oven at 120° C. for 2 hours. At the end of this cure cycle, a tough, adherent protective copolymeric coating has formed on the panels. Useful protective coatings can also be formed on other common materials of construction, such as metals, ceramics, etc.

In another preparation, a solid, tack-free, rubber-like product is obtained in about 15 minutes after mixing together at room temperature about 100 parts of "Emery 3055–S" polymerized fatty acid with 41.6 parts of liquid N,N'-bis-1,2-ethylenisosebacamide. A second portion of uncured syrupy polymer mixture of the same composition is poured into open molds and cured for 14 hours at 120° C. The resulting rubber is subjected to a series of electrical and physical tests the results of which are as follows:

Electrical properties — Bis-amide-cured fatty acid polymer
- Dielectric constant (ASTM D150–54T), 1 kc., 25° C. _____ 4.5
- Dissipation factor (ASTM C150–54T), 1 kc., 25° C. _____ 0.064

Physical properties
- Scott brittleness, $T_B$ (° C.) (ASTM D764–57T) _____ −35 to −40
- Gehman $T_{10}$, (° C.) (ASTM D1053–54T) _____ +11
- Tensile strength, p.s.i.[1] _____ 800
- Elongation, percent[1] _____ 90
- Set at break, percent[1] _____ 0

Volume swelling, percent (ASTM D471–55T):
- 70:30 isooctane:toluene, 48 hrs. at 82° C. _____ 40
- Water, 70 hrs. at 82° C. _____ 0

[1] Tensile strength, elongation and set at break are measured using dumbbell-shaped specimens 0.125″ wide, 0.080″ thick and 0.5″ between bench marks at a jaw separation rate of 2 inches per minute. Test values correlate with those from ASTM D412–51T.

One hundred parts of "Emery 3055–S" polymerized fatty acid (having a dimer-trimer ratio of about 15:85) and 75 parts of a refined liquid coal tar (marketed under the designation RC–5 are mixed and 52 parts of N,N′-bis-1,2-ethylenisosebacamide are thereafter added. The resulting resin is sufficiently fluid at room temperature to be poured into casting molds. The castings cure bubble-free in 24 hours at room temperature to a soft rubber-like solid, and a 1½ hour cure cycle at 120° C. converts the liquid mixture into a tack-free rubber which has the following physical characteristics:

Mechanical properties—
- Immediately after curing:
  - Tensile strength, p.s.i. _____ 255
  - Elongation, percent _____ 160
  - Set at break, percent _____ 0
- After air aging 96 hr. at 177° C.:
  - Tensile strength, p.s.i. _____ 690
  - Elongation, percent _____ 0
  - Weight loss, percent _____ 20

Low temperature flexibility:
- Gehman $T_{10}$ (° C.) _____ −6
- Scott brittleness, $T_B$ (° C.) _____ −7

Volume swelling, percent:
- 70:30 isooctane:toluene, 48 hrs. at 82° C. _____ 15
- Water, 70 hrs. at 82° C. _____ 5

Water absorption (at 22° C.):
- 24 hours, percent _____ 0.63
- 7 days, percent _____ 1.19
- 10 days, percent _____ 1.31

Specific gravity, gm./ml. _____ 1.02

*Example 2*

The following series of polymerized mixtures are prepared, with warming where solid poly-1,2-alkylenamides are used, for the purpose of comparing them as to their mechanical properties, low temperature flexibility, electrical and solvent resistance properties:

| Constituents (indicated in parts by weight under lot designations) | Lot |  |  |  |  |  |  |
|---|---|---|---|---|---|---|---|
|  | A | B | C | D | E | F | G |
| N,N′-bis-1,2-ethylenisosebacamide | 31.2 | 41.6 | 54.1 | 62.4 |  |  |  |
| N,N′-bis-1,2-ethylenisophthalamide |  |  |  |  | 44.6 |  | 44.6 |
| N,N′-bis-1,2-propylenisosebacamide |  |  |  |  |  | 58 |  |
| "Emery 3079–S" polymerized fatty acid (Dimer-trimer acid ratio 95:5) |  |  |  |  |  |  | 25 |
| "Emery 3055–S" polymerized acid (Dimer-trimer acid ratio 15:85) | 100 | 100 | 100 | 100 | 100 | 100 | 75 |
| Ratio-Imine Ring:COOH | 3/4 | 1/1 | 4/3 | 3/2 | 5/4 | 5/4 | 5/4 |

These mixtures are poured into open molds, cured for 14 hours at 120° C. and subjected to the following tests:

|  | Lot |  |  |  |  |  |  |
|---|---|---|---|---|---|---|---|
|  | A | B | C | D | E | F | G |
| Mechanical tests: |  |  |  |  |  |  |  |
| Tensile Strength, p.s.i. | 85 | 240 | 800 | 300 | 3,380 | 605 | 1,350 |
| Elongation, percent | 150 | 135 | 90 | 95 | 0 | 160 | 175 |
| Set at Break, percent | 0 | 0 | 0 | 0 | 0 | 0 | 0 |
| After Air Aging 96 hrs. at 177° C.: |  |  |  |  |  |  |  |
| Tensile Strength, p.s.i. |  | 275 | 480 | 580 | 340 | 641 | 335 |
| Elongation, percent |  | 0 | 0 | 0 | 0 | 0 | 0 |
| Weight Loss, percent | 2.6 | 2.6 | 3.0 | 3.0 | 1.7 | 7 | 3.0 |
| Low Temperature Flexibility Tests: |  |  |  |  |  |  |  |
| Gehman $T_{10}$, ° C. | 5 | 6 | 11 | 10 | (¹) | 15 | 16 |
| Scott Brittleness, $T_B$, ° C. | −27 to −29 | −54 to −58 | −35 to −40 | −32 to −35 | 0 | −66 to −70 | −30 to −35 |
| Volume Swelling percent: |  |  |  |  |  |  |  |
| 70:30 Isooctane:toluene, 48 hrs. at 82° C. | 59 | 59 | 40 | 40 | 41 | 49 | 45 |
| Water, 70 hrs., 82° C. |  | 7 | 0 | 7 | 7 | 0 | 15 |
| Electrical Tests: |  |  |  |  |  |  |  |
| Dissipation factor 1 kc., 25° C. | 0.263 | 0.210 | 0.0635 | 0.0919 | 0.0012 | 0.072 | 0.0364 |
| Dielectric constant 1 kc., 25° C. | 6.11 | 5.60 | 4.50 | 5.00 | 3.86 | 3.77 | 4.93 |

¹ Too rigid for test.

With regard to the foregoing electrical test data, it should be noted that the product of the dielectric constant <K> and the dissipation factor <D> is a relative measure of energy loss accompanying the passage of an alternating electric current. The requirements for the values of these measurements in electrical insulating, casting and potting applications vary widely with the particular situation. In cases in which large amounts of current are involved they assume greater importance, while in other cases in which only small currents pass through the component being insulated, other properties of the dielectric (e.g. stresses and strains in the cured dielectric and imparted to the component, convenience of handling the dielectric during encapsulation, adhesion to the component, resistance of the cured dielectric to its environment, etc.) may be more critical.

The following series of copolymers is prepared to compare certain of their electrical properties, the number of parts of each component being stated.

|  | Lot Numbers | | | | | | | |
|---|---|---|---|---|---|---|---|---|
|  | 1 | 2 | 3 | 4 | 5 | 6 | 7 | 8 |
| N,N'-bis-1,2-propylenisosebacamide |  |  | 53 | 53 |  |  |  |  |
| N,N'-bis-1,2-ethylenisosebacamide | 52 | 52 |  |  |  |  |  |  |
| N,N'-bis-1,2-ethylensebacamide |  |  |  |  | 52 | 52 |  |  |
| N,N'-bis-1,2-ethylenisophthalamide |  |  |  |  |  |  | 45 | 45 |
| "Emery 3055-S" polymerized fatty acid | 100 | 50 | 100 | 50 | 100 | 50 | 100 | 50 |
| "Emery 3079-S" polymerized fatty acid |  | 50 |  | 50 |  | 50 |  | 50 |

These mixtures are cast into 0.0080 inch thick films and cured for 1 hour at 120° C. The volume resistivity and dielectric strength of the resulting resins are then evaluated as follows:

| Lot No. | Volume Resistivity (ASTM D257-54T) (ohm-cm.) 30° C. / (ohm-cm.) 60° C. | Dielectric Strength (ASTM D149 55T) (volts/mil) |
|---|---|---|
| 1 | $\frac{4.2 \times 10^{10}}{1.4 \times 10^{8}}$ | 422 |
| 2 | $\frac{7.9 \times 10^{9}}{2.2 \times 10^{8}}$ | 396 |
| 3 | $\frac{1.5 \times 10^{11}}{2.9 \times 10^{8}}$ | 533 |
| 4 | $\frac{1.7 \times 10^{10}}{1.4 \times 10^{8}}$ | 348 |
| 5 | $\frac{3.6 \times 10^{9}}{3.1 \times 10^{8}}$ | 303 |
| 6 | $\frac{2.5 \times 10^{4}}{1.6 \times 10^{3}}$ | 249 |
| 7 | $\frac{1.1 \times 10^{13}}{6.7 \times 10^{9}}$ | 715 |
| 8 | $\frac{2.2 \times 10^{12}}{3 \times 10^{9}}$ | 610 |

*Example 3*

The following two compositions are prepared by warming the constituents (indicated in parts by weight) slightly, and then mixing them:

|  | Lots | |
|---|---|---|
|  | A | B |
| N,N'-bis-1,2-ethylenisophthalamide | 10.8 | 10.8 |
| "Emery 3055-S" Polymerized fatty acid | 30 | 18.5 |

The resulting smooth mixtures are poured into open molds. Lot A forms a tough rubber after a cure of 1 hour at 93° C. Lot B forms a soft, non-tacky semi-rigid solid after standing for 24 hours at room temperature and a tough but flexible resin after a cure of 1 hour at 93° C.

*Example 4*

About 100 parts of "Emery 3055-S" polymerized fatty acid are mixed with 22.5 parts of N,N'-bis-1,2-ethylenisosebacamide and 22.5 parts of N,N'-bis-1,2-ethylenisophthalamide with warming. The resulting low viscosity liquid mixture is readily poured into an open mold and reacts rapidly in a ¾" thick casting with the evolution of heat to yield a transparent brownish rubber-like solid which is free of air bubbles. After this casting is allowed to stand overnight at room temperature, its hardness (Shore A–2) is found to be 31. This value is increased to 43 if the sample is heated for one hour in an air oven at 150° C. No shrinkage takes place during the cure.

*Example 5*

About 100 parts of the liquid tetrameric acid product "4308–F" polymerized fatty acid are mixed thoroughly with various amounts of poly-1,2-alkylenamides (with warming where required) as shown in the following table. A portion of the resulting viscous syrup from each lot is spin-cast under vacuum in an oven at 120° C. for 1 hour. The physical characteristics of the films thus formed are also given in the table.

|  | Lot No. | | | | |
|---|---|---|---|---|---|
|  | 1 | 2 | 3 | 4 | 5 |
| Constituents (parts by weight): |  |  |  |  |  |
| "4308–F" polymerized fatty acid | 100 | 100 | 100 | 100 | 100 |
| N,N'-bis-1,2-ethylenisosebacamide | 50 |  |  |  |  |
| N,N'-bis-1,2-ethylensebacamide |  | 50 |  |  |  |
| N,N'-bis-1,2-ethylenisophthalamide |  |  | 43 |  |  |
| N,N'-bis-1,2-propylenisophthalamide |  |  |  | 48 |  |
| N,N'-bis-1,2-propylenisosebacamide |  |  |  |  | 55 |
| Tensile Properties Immediately after curing: |  |  |  |  |  |
| Tensile Strength, p.s.i. | 140 | 70 | 410 | 570 | 140 |
| Elongation, percent | 35 | 20 | 85 | 135 | 55 |
| Set at Break, percent | 0 | 0 | 0 | 0 | 0 |
| After Air Aging 96 hrs. at 177° C.: |  |  |  |  |  |
| Tensile Strength, p.s.i. | 455 | 645 | 3,000 | 3,700 | 550 |
| Elongation, percent | 40 | 10 | 10 | 10 | 25 |
| Weight Loss, percent | 15.3 | 18 | 15.1 | 15.8 | 19.7 |
| Low Temperature Flexibility: |  |  |  |  |  |
| Gehman $T_{10}$, ° C. | −10 | −13 | +12 | +15.5 | −6.5 |
| Scott Brittleness, $T_B$, ° C. | −59 to −63 | −35 to −40 | −22 to −26 | −22 to −26 | −41 to −43 |
| Volume Swelling, percent: |  |  |  |  |  |
| 70:30 Isooctane:toluene (48 hrs. at 82° C.) | 31.3 | 31.3 | 31.3 | 39.9 | 39.9 |
| Water (70 hrs. at 82° C.) | 7.4 | 15.1 | 15.1 | 15.1 | 15.1 |
| Water Absorption at 22° C.: |  |  |  |  |  |
| 24 hrs., percent | 2.14 | 3.47 | 1.31 | 1.01 | 1.58 |
| 7 days, percent | 5.12 | 7.3 | 3.06 | 2.47 | 3.64 |
| 11 days, percent | 6.2 | 8.57 | 3.54 | 2.98 | 4.28 |

Example 6

Stable N,N'-bis-1,2-propylenterephthalamide monomer useful for reacting with the polyene higher fatty acids is prepared as follows: about 400 ml. of water, 41.4 grams (0.3 M) of potassium carbonate and 23.9 grams (0.42 M) of 1,2-propylenimine are added with stirring and cooling to a 1000 ml. three-necked flask equipped with a stirrer, thermometer, condenser and dropping funnel. When solution occurs and at a temperature of approximately 12° C., a solution of 40.6 grams of terephthaloyl dichloride in 300 ml. of benzene is added dropwise with vigorous stirring over a period of approximately 45 minutes. The temperature is maintained at approximately 12–15° C. by means of an ice bath. After the benzene solution is added, the ice bath is removed and stirring is continued for an additional hour. The benzene layer is then separated from the aqueous layer and the solvent is removed by distillation under vacuum. A yield of 47.8 grams (98 percent of theoretical) of white crystalline N,N'-bis-1,2-propylenterephthalamide monomer is obtained. The material, which melts at about 96–108° C., is found to contain 11.30 percent of nitrogen and 46.0 percent of 2-methylazirane radical as compared to calculated values of 11.48 percent and 45.9 percent respectively.

Other alkylenterephthalamides are prepared in similar manner, using ethylenimine or appropriately substituted ethylenimines as starting materials. Thus, using ethylenimine and 1,2-butylenimine, for example, in corresponding stoichiometric amounts, there are obtained, respectively, N,N'-bis-ethyleneterephthalamide, M.P. ca. 140° C., and N,N'-bis-1,2-butylenterephthalamide, M.P. 98–110° C.

About 100 parts of "Emery 3055-S" polymerized fatty acid are mixed with 41 parts of N,N'-bis-1,2-propylenterephthalamide and the mixture is heated with agitation until a homogeneous mixture is obtained. The solution is then cured for 30 minutes at 120° C. to form a flexible, solid resin similar to those of the previous examples.

Example 7

About 100 parts of "Emery 3055-S" polymerized fatty acid are mixed with 45 parts of N,N'-bis-1,2-butylenterephthalamide and the mixture is heated with agitation until a homogeneous mixture is obtained. The solution is then cured for 30 minutes at 120° C. to form a flexible, solid resin similar in properties to those of the previous examples.

Example 8

About 100 parts of "Emery 3055-S" polymerized fatty acid and 52 parts of liquid N,N'-bis-1,2-ethylenisosebacamide are mixed thoroughly. This liquid mixture is poured into a 600 ml. stainless steel beaker in which is suspended a cylindrical pattern about 2" in diameter and threaded at one end, previously coated with a mold release agent. A sufficient amount of the liquid mixture is added to the beaker to submerge the pattern to a point about 1½" above the threads. The liquid becomes tack-free in about 20 minutes at approximately 25° C. and after 24 hours at 25° C. it has cured to a tough rubber. The rubbery mold containing the pattern is removed from the beaker and the mold is slit along one side to remove the pattern. An excellent negative reproduction of the pattern including the threads is achieved in the rubbery mold, due particularly to the facts that the mold before curing had been a mobile liquid, that no bubbles are generated either within the copolymer itself or at its surfaces during the curing process, that the uncured liquid is 100 percent solids-forming and therefore undergoes no appreciable amount of shrinking during curing and finally that, being rubbery in nature, it can be removed from complex (e.g. undercut) shapes easily and without damage. A particular advantage of this composition in flexible mold applications (as compared to other flexible mold compositions) is its excellent ability to withstand temperatures up to at least 350° C. without appreciable damage and to be reused after heating. This ability to withstand high temperatures can of course be extended even further with the use of fillers, antioxidants and other compounding techniques known to the art. Thus, in addition to being useful in the casting of materials in which high temperature resistance of the mold is unnecessary, such as various resins and plaster of Paris, it may also be used in the casting of low melting metals and metal alloys such as for example Wood's metal, lead solder, tin, lead, etc. Specimens of this elastomer are also subjected to a series of standard tests, the results of which are as follows:

Mechanical properties:
    Tensile strength, p.s.i. _____ 480
    Elongation, percent _____ 125
    Set at break, percent _____ 0

Low temperature flexibility tests:
    Scott brittleness, $T_B$, (° C. below) _____ −70

Volume swelling:
    70:30 isooctane:toluene, 48 hours at 82° C. __ 39.9
    Water, 70 hours at 82° C. _____ 7.4

Water absorption, at 25° C.:
    24 hours, percent _____ 1.47
    7 days, percent _____ 3.28
    10 days, percent _____ 3.39

Example 9

A series of four liquid mixtures of poly-1,2-alkylenamides and polymerized polyene higher fatty acids are prepared according to the following compositions (indicated in parts by weight under each lot):

| Constituents | Lots | | | |
| --- | --- | --- | --- | --- |
| | A | B | C | D |
| N,N'-bis-1,2-ethylenisosebacamide | 52.6 | 61.5 | 52.7 | 52.9 |
| "Emery 3130-R" polymerized fatty acid | 100 | | 75 | 50 |
| "Emery 3215-R" polymerized fatty acid | | 100 | | |
| "Emery 3244-R" polymerized fatty acid | | | 25 | 50 |

The respective gel times of the lots at room temperature and the appearances of the resulting solid polymers are as follows:

| | Lots | | | |
| --- | --- | --- | --- | --- |
| | A | B | C | D |
| Gel Time at Approximately 25° C. (minutes) | 30 | 5 | 10 | 10. |
| Color | Light yellow. | Black. | Light yellow. | Light yellow. |

The respective liquid mixtures are poured into open aluminum molds and cured for 24 hours at approximately 25° C. and 1 hour at 120° C. The following data are obtained from tests run on these rubbers:

|  | A | B | C | D |
|---|---|---|---|---|
| Mechanical Properties: |  |  |  |  |
| Tensile Strength, p.s.i. | 158 | 166 | 163 | 287 |
| Elongation at break, percent | 120 | 50 | 130 | 155 |
| Low Temperature Flexibility Tests: Scott |  |  |  |  |
| Brittleness, $T_B$, ° C. | −36 | −8 | −56 | −38 |
| Gehman Tests, ° C.: |  |  |  |  |
| $T_2$ | +4 |  | −1 | −1 |
| $T_5$ | −1 |  | −4 | −7 |
| $T_{10}$ | −4 |  | −8 | −11 |
| $T_{100}$ | −14 |  | −18 | −18 |
| After Air Aging 96 hrs. at 177° C.: |  |  |  |  |
| Tensile Strength, p.s.i. | 100 | 294 | 207 | 92 |
| Elongation at Break, percent | 38 | 22 | 42 | 48 |
| Volume Swelling: |  |  |  |  |
| 70:30 Isooctane:toluene, 48 hrs. at 82° C. | 7.3 | 9.2 | 7.3 | 7.0 |
| Water, 70 hrs. 82° C. | 48.1 | 27.0 | 54.0 | 69.0 |

*Example 10*

About 36 parts of N,N′,N″-tris-1,2-propylentrimesamide are dissolved in 150 parts of chloroform and the resulting solution is mixed into 100 parts of "Emery 3162-S" polymerized fatty acid. The mixture is stirred and warmed slightly until it is homogeneous and is allowed to stand for 48 hours at room temperature. The resulting tack-free, flexible material, which is transparent and brown in color, is then post-cured for one hour at 100° C. to form a tough, leathery resin.

The terms and expressions which are employed herein are used as terms of description and not of limitation, and it is not intended, in the use of such terms and expressions, to exclude any equivalents of the features shown and described or portions thereof, but it is recognized that various modifications are possible within the scope of the invention claimed.

What is claimed is:

1. A 100 percent solids-forming liquid comprising a mixture of a polymerized polyene higher fatty acid, said acid containing from about 14 to 22 carbon atoms, and a poly-1,2-alkylenamide.

2. A polymer comprising a polymerized polyene higher fatty acid, said acid containing from about 14 to 22 carbon atoms, reacted with a poly-1,2-alkylenamide.

3. A polymer comprising a polymerized polyene higher fatty acid, said acid containing from about 14 to 22 carbon atoms, reacted with a polyamide-containing composition selected from the group consisting of aliphatic N,N′-bis-1,2-alkylenamides, aromatic N,N′-bis-1,2-alkylenamides and aromatic N,N′,N″-tris-1,2-alkylenamides.

4. A polymer comprising a polymerized polyene higher fatty acid, said acid conttaining from about 14 to 22 carbon atoms, reacted with a poly-1,2-alkylenamide represented by the formula:

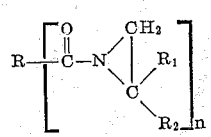

wherein R represents a member of the group consisting of divalent aliphatic radicals having from about 4 to 53 carbon atoms, the 1,3-phenylene radical, the 1,4-phenylene radical and the 1,3,5-phenyline radical, $R_1$ and $R_2$ each represent a member of the group consisting of hydrogen and alkyl radicals containing from 1 to 8 carbon atoms; and $n$ is a number corresponding to the valency of R.

5. A polymer comprising a polymerized polyene higher fatty acid, said acid containing from about 14 to 22 carbon atoms, reacted with an N,N′,N″-tric-1,2-alkyleneamide represented by the formula:

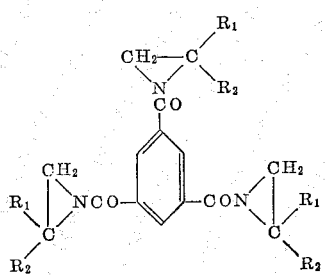

wherein $R_1$ and $R_2$ each represent a member of the group consisting of hydrogen and alkyl radicals containing from 1 to 8 carbon atoms.

6. A polymer comprising a polymerized polyene higher fatty acid, said acid containing from about 14 to 22 carbon atoms, reacted with an N,N-bis-1,2-alkylene amide represented by the formula:

$$R_1 \diagup\!\!\!\!\!\underset{C}{\overset{CH_2}{|}}\!\!\!\!\!\diagdown NCO-R-CON \diagup\!\!\!\!\!\underset{C}{\overset{CH_2}{|}}\!\!\!\!\!\diagdown R_1$$
(with $R_2$ substituents)

wherein R is a divalent aliphatic radical having about 4 to 53 carbons, and $R_1$ and $R_2$ each represent a member of the group consisting of hydrogen and alkyl radicals containing from 1 to 8 carbon atoms.

7. A polymer comprising a polymerized polyene higher fatty acid of the group consisting of dimeric higher fatty acids and trimeric higher fatty acids, which acids contain from about 14 to 22 carbon atoms, reacted with a poly-1,2-alkylenamide represented by the formula:

$$\left[ R - \overset{O}{\underset{\|}{C}} - N \diagup\!\!\!\!\!\underset{C}{\overset{CH_2}{|}}\!\!\!\!\!\diagdown \begin{matrix} R_1 \\ R_2 \end{matrix} \right]_n$$

wherein R represents a member of the group consisting of divalent aliphatic radicals having from about 4 to 53 carbon atoms, the 1,3-phenylene radical, the 1,4-phenylene radical and the 1,3,5-phenyline radical; $R_1$ and $R_2$ each represent a member of the group consisting of hydrogen and alkyl radicals containing from 1 to 8 carbon atoms; and $n$ is a number corrresponding to the valency of R.

8. A polymer comprising a dimeric polyene higher fatty acid, said acid containing from about 14 to 22 carbon atoms, reacted with a poly-1,2-alkylenamide represented by the formula:

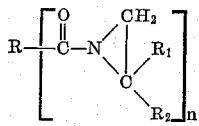

wherein R represents a member of the group consisting of divalent aliphatic radicals having from about 4 to 53 carbon atoms, the 1,3-phenylene radical, the 1,4-phenylene radical and the 1,3,5-phenyline radical; $R_1$ and $R_2$ each represent a member of the group consisting of hydrogen and alkyl radicals containing from 1 to 8 carbon atoms; and $n$ is a number corresponding to the valency of R.

9. A polymer comprising a trimeric polyene higher fatty acid, said acid containing from about 14 to 22 carbon atoms, reacted with a poly-1,2-alkylenamide represented by the formula:

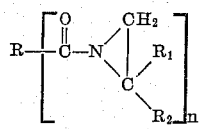

wherein R represents a member of the group consisting of divalent aliphatic radicals having from about 4 to 53 carbon atoms, the 1,3-phenylene radical, the 1,4-phenylene radical and the 1,3,5-phenyline radical; $R_1$ and $R_2$ each represent a member of the group consisting of hydrogen and alkyl radicals containing from 1 to 8 carbon atoms; and $n$ is a number corresponding to the valency of R.

10. A polymer comprising a polymerized polyene higher fatty acid, said acid containing from about 14 to 22 carbon atoms, reacted with N,N'-bis-1,2-ethylenisosebacamide, represented by the formula:

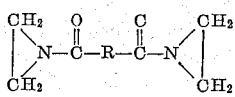

wherein R represents the divalent hydrocarbon residue of isosebacic acid which consists essentially of from about 72–80% of —$CH_2$—$CH(C_2H_5)$—$(CH_2)_4$—, 12 to 18% of —$CH(C_2H_5)$—$CH_2$—$CH(C_2H_5)$—$CH_2$—, and 6–10% of normal —$(CH_2)_8$—.

11. A polymer comprising a polymerized polyene higher fatty acid, said acid containing from about 14 to 22 carbon atoms, reacted with N,N'-bis-1,2-propylenisosebacamide represented by the formula:

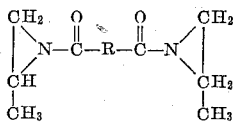

wherein R represents the divalent hydrocarbon residue derived from isosebacic acid which consists essentially of from about 72–80% of —$CH_2$—$CH(C_2H_5)$—$(CH_2)_4$—, 12–18% of —$CH(C_2H_5)$—$CH_2$—$CH(C_2H_5)$—$CH_2$—, and 6–10% of normal —$(CH_2)_8$—.

12. A polymer comprising a mixture of dimeric and trimeric acids derived from linoleic acid, reacted with N,N'-bis-1,2-ethylenisosebacamide represented by the formula:

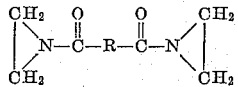

wherein R represents the divalent hydrocarbon residue derived from isosebacic acid which consists essentially of from about 72–80% of
—$CH_2$—$CH(C_2H_5)$—$(CH_2)_4$—
12–18% of —$CH(C_2H_5)$—$CH_2$—$CH(C_2H_5)$—$CH_2$—,
and 6–10% of normal —$(CH_2)_8$.

13. A polymer comprising a mixture of dimeric and trimeric acids derived from linoleic acid, reacted with N,N'-bis 1,2-ethylensebacamide represented by the formula:

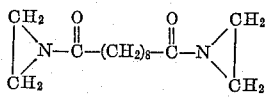

14. A polymer comprising a mixture of dimeric and trimeric acids derived from linoleic acid, reacted with N,N'-bis-1,2-ethylenisophthalamide represented by the formula:

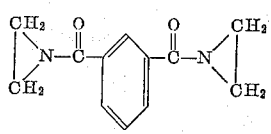

15. A polymer comprising a mixture of dimeric and trimeric acids derived from linoleic acid, reacted with a poly-1,2-alkylenamide represented by the formula:

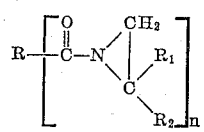

wherein R represents a member of the group consisting of divalent aliphatic radicals having from about 4 to 53 carbon atoms, the 1,3-phenylene radical, the 1,4-phenylene radical and the 1,3,5-phenyline radical; $R_1$ and $R_2$ each represent a member of the group consisting of hydrogen and alkyl radicals containing from 1 to 8 carbon atoms; and $n$ is a number corresponding to the valency of R.

16. A polymer comprising a polymerized polyene higher fatty acid, said acid containing from about 14 to 22 carbon atoms, reacted with a plurality of curing agents chosen from the group consisting of polyalkylenamides represented by the formula:

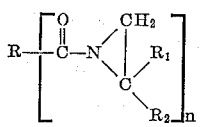

wherein R represents a member of the group consisting of alkylene radicals having from about 4 to 53 carbon atoms, the 1,3-phenylene radical, the 1,4-phenylene radical and the 1,3,5-phenyline radical, $R_1$ and $R_2$ each represent a member of the group consisting of hydrogen and alkyl radicals containing from 1 to 8 carbon atoms and $n$ is a number corresponding to the valency of R.

17. A polymer comprising a polymerized polyene higher fatty acid, said acid containing from about 14 to 22 carbon atoms, reacted with N,N'-bis-1,2-propylenterephthalamide represented by the formula:

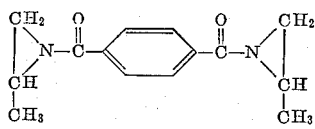

18. A polymer comprising a polymerized polyene higher fatty acid, said acid containing from about 14 to 22 carbon atoms, reacted with N,N'-bis-1,2-butylenterephthalamide represented by the formula:

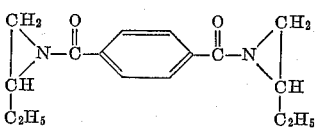

19. A polymer comprising a polymeric polyene higher fatty acid, said acid containing from about 14 to 22 carbon atoms, cured with an N,N'-bis-1,2-alkylene amide represented by the formula:

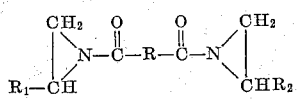

where R represents a member of the group consisting of alkylene radicals having from 6 to 18 carbon atoms and the 1,3-phenylene radical, and $R_1$ and $R_2$ each represent a member of the group consisting of hydrogen and alkyl radicals containing from 1 to 8 carbon atoms.

20. A polymer comprising a polymeric polyene higher fatty acid of the group consisting of dimeric higher fatty acids and trimeric higher fatty acids, which acids contain from about 14 to 22 carbon atoms, cured with an N,N'-bis-1,2-alkyleneamide represented by the formula:

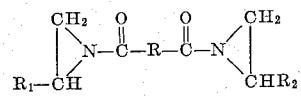

where R represents a member of the group consisting of alkylene radicals having from 6 to 18 carbon atoms and the 1,3-phenylene radical, and $R_1$ and $R_2$ each represent a member of the group consisting of hydrogen and alkyl radicals containing from 1 to 8 carbon atoms.

21. A polymer comprising a dimer of a higher fatty acid which acid contains from about 14 to 22 carbon atoms, reacted with an N,N'-bis-1,2-alkyleneamide represented by the formula:

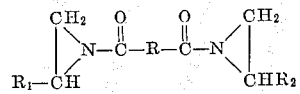

where R represents a member of the group consisting of alkylene radicals having from 6 to 18 carbon atoms and the 1,3-phenylene radical, and $R_1$ and $R_2$ each represent a member of the group consisting of hydrogen and alkyl radicals containing from about 1 to 8 carbon atoms.

22. A polymer comprising trimer of a higher fatty acid which acid contains from about 14 to 22 carbon atoms cured with an N,N'-bis-1,2-alkyleneamide represented by the formula:

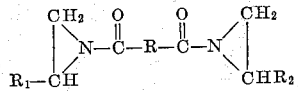

where R represents a member of the group consisting of alkylene radicals having from 6 to 18 carbon atoms and the 1,3-phenylene radical, and $R_1$ and $R_2$ each represent a member of the group consisting of hydrogen and alkyl radicals containing from about 1 to 8 carbon atoms.

23. A polymer comprising a mixture of dimeric and trimeric acids derived from linoleic acid, cured with an N,N'-bis-1,2-alkyleneamide represented by the formula:

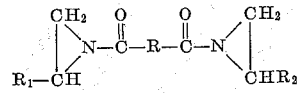

where R represents a member of the group consisting of alkylene radicals having from 6 to 18 carbon atoms and the 1,3-phenylene radical, and $R_1$ and $R_2$ each represent a member of the group consisting of hydrogen and alkyl radicals containing from 1 to 8 carbon atoms.

24. A polymer comprising a polymeric polyene higher fatty acid, said acid containing from about 14 to 22 carbon cured with at least a stoichiometric amount of an N,N'-bis-1,2-alkyleneamide represented by the formula:

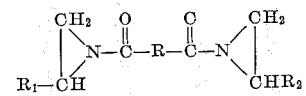

where R represents a member of the group consisting of alkylene radicals having from 6 to 18 carbon atoms and the 1,3-phenylene radical, and $R_1$ and $R_2$ each represent a member of the group consisting of hydrogen and alkyl radicals containing from 1 to 8 carbon atoms.

25. A polymer comprising a polymeric polyene higher fatty acid, said acid containing from about 14 to 22 carbon atoms cured with a plurality of curing agents chosen from the group consisting of N,N'-bis-1,2-alkylene amides represented by the formula:

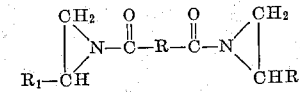

where R represents a member of the group consisting of alkylene radicals having from 6 to 18 carbon atoms and the 1,3-phenylene radical, and $R_1$ and $R_2$ each represent a member of the group consisting of hydrogen and alkyl radicals containing from 1 to 8 carbon atoms.

No references cited.

CHARLES B. PARKER, *Primary Examiner.*

A. H. SUTTO, *Assistant Examiner.*